(12) United States Patent
Suto et al.

(10) Patent No.: US 12,169,709 B2
(45) Date of Patent: Dec. 17, 2024

(54) CONTEXTUALLY COGNITIVE EDGE SERVER MANAGER

(71) Applicant: Kyndryl, Inc., New York, NY (US)

(72) Inventors: Tiberiu Suto, Franklin, NY (US);
Shikhar Kwatra, San Jose, CA (US);
Raghuveer Prasad Nagar, Kota (IN);
Jagadesh Ramaswamy Hulugundi, Bangalore (IN)

(73) Assignee: Kyndryl, Inc., New York, NY (US)

( * ) Notice: Subject to any disclaimer, the term of this patent is extended or adjusted under 35 U.S.C. 154(b) by 150 days.

(21) Appl. No.: 17/708,405

(22) Filed: Mar. 30, 2022

(65) Prior Publication Data
US 2023/0315438 A1 Oct. 5, 2023

(51) Int. Cl.
| | | |
|---|---|---|
| G06F 8/658 | (2018.01) | |
| G06F 8/71 | (2018.01) | |
| G06F 9/46 | (2006.01) | |
| G06F 9/50 | (2006.01) | |
| G06F 11/34 | (2006.01) | |
| G06F 21/64 | (2013.01) | |
| G06N 20/20 | (2019.01) | |

(52) U.S. Cl.
CPC ............. *G06F 8/658* (2018.02); *G06F 8/71* (2013.01); *G06F 9/466* (2013.01); *G06F 9/5077* (2013.01); *G06F 11/3457* (2013.01); *G06F 21/64* (2013.01); *G06N 20/20* (2019.01)

(58) Field of Classification Search
None
See application file for complete search history.

(56) References Cited

U.S. PATENT DOCUMENTS

| | | | |
|---|---|---|---|
| 9,923,897 B2 | 3/2018 | Houston et al. | |
| 11,096,036 B2 | 8/2021 | Poornachandran et al. | |
| 11,132,897 B2 | 9/2021 | McErlean et al. | |
| 2005/0015760 A1* | 1/2005 | Ivanov | G06F 8/65 717/174 |
| 2007/0044153 A1* | 2/2007 | Schuba | G06F 21/55 713/188 |
| 2007/0244999 A1* | 10/2007 | Hamanaka | H04L 67/34 709/220 |
| 2008/0178167 A1* | 7/2008 | Sriram | G06F 8/658 717/169 |

(Continued)

FOREIGN PATENT DOCUMENTS

CN 110036597 7/2019

OTHER PUBLICATIONS

Mell et al., "The NIST Definition of Cloud Computing", NIST, Special Publication 800-145, Sep. 2011, 7 pages.

(Continued)

*Primary Examiner* — Qing Chen
(74) *Attorney, Agent, or Firm* — Dan Housley; Andrew D. Wright; Calderon Safran & Wright P.C.

(57) ABSTRACT

A method includes: predicting a jeopardy associated with an edge server included in the server cluster that communicates with a central server; responsive to predicting the jeopardy, detaching the edge server from the server cluster; determining a patch based on the jeopardy; pushing the patch to the edge server; validating the patch by performing regression testing; and responsive to validating the patch, inducting the edge server into the server cluster.

20 Claims, 5 Drawing Sheets

(56) References Cited

U.S. PATENT DOCUMENTS

| | | | | |
|---|---|---|---|---|
| 2011/0258601 | A1* | 10/2011 | Ndem | G06F 11/3676 |
| | | | | 717/124 |
| 2013/0340074 | A1* | 12/2013 | Ayachitula | G06F 21/577 |
| | | | | 726/22 |
| 2015/0135158 | A1* | 5/2015 | Tenev | G06F 11/3684 |
| | | | | 717/101 |
| 2016/0162385 | A1* | 6/2016 | Allen | G06F 11/368 |
| | | | | 714/38.1 |
| 2016/0203010 | A1* | 7/2016 | Azizian | G06F 11/3476 |
| | | | | 703/23 |
| 2016/0259638 | A1* | 9/2016 | El Maghraoui | G06F 8/65 |
| 2017/0034023 | A1* | 2/2017 | Nickolov | H04L 43/0817 |
| 2017/0142228 | A1* | 5/2017 | Byrne | H04L 41/0813 |
| 2018/0068241 | A1* | 3/2018 | Varkey | G06Q 10/0635 |
| 2018/0351987 | A1* | 12/2018 | Patel | G06F 21/577 |
| 2019/0102548 | A1* | 4/2019 | Bulut | G06F 21/577 |
| 2020/0110877 | A1* | 4/2020 | Bulut | G06F 21/568 |
| 2020/0404012 | A1* | 12/2020 | Pichetti | H04L 63/1433 |
| 2021/0150029 | A1* | 5/2021 | Bulut | G06F 21/561 |
| 2022/0164246 | A1* | 5/2022 | Shen | G06F 11/0793 |
| 2023/0039730 | A1* | 2/2023 | Li | G06N 20/00 |

OTHER PUBLICATIONS

Park et al., "CIoT-Net: A Scalable Cognitive IoT Based Smart City Network Architecture", Human-centric Computing and Information Sciences, 2019, 20 pages.

Governor et al., "Web 2.0 Architectures", 2020, 89 pages.

Anonymously, "Intelligent Selection of Authorization Access Level Based on the Context and Stress Analysis", PCOM000266770D, ip.com, Aug. 18, 2021, 5 pages.

Anonymously, "Method and System for Contextually Aware Knowledge Augmentation for a Pre-Existing Knowledge Base", IPCOM000265695D, ip.com, May 6, 2021, 6 pages.

Anonymously, "Method of Using Contextual Service Discovery to Implicitly Surface Useful External Developer Tools from an IDE", IPCOM000257162D, ip.com, Jan. 17, 2019, 6 pages.

Anonymously, "Cognitive Qualification, Rating and Settlement for Service Agent Interactions", ipcom000251535dip.com, Nov. 8, 2017, 6 pages.

* cited by examiner

Aspects of the present invention relate generally to edge computing systems and, more particularly, to managing edge servers.

A cloud is an information technology (IT) environment that abstracts, pools, and shares IT resources across a network. An edge is a computing location at the edge of a network, along with the hardware and software at those physical locations. Cloud computing is the act of running workloads within clouds, while edge computing is the act of running workloads on edge devices. Edge computing facilitates data storage and computing resources at close proximity to an end user's consumption of the data and/or services, and this typically improves performance for the end user.

SUMMARY

In a first aspect of the invention, there is a method performed by an edge manager device in a server cluster, the method including: predicting a jeopardy associated with an edge server included in the server cluster that communicates with a central server; responsive to predicting the jeopardy, detaching the edge server from the server cluster; determining a patch based on the jeopardy; pushing the patch to the edge server; validating the patch by performing regression testing; and responsive to validating the patch, inducting the edge server into the server cluster.

In another aspect of the invention, there is a computer program product including one or more computer readable storage media having program instructions collectively stored on the one or more computer readable storage media. The program instructions are executable to: predict a jeopardy associated with an edge server included in a server cluster that communicates with a central server; responsive to predicting the jeopardy, detach the edge server from the server cluster, wherein other edge servers in the server cluster continue to communicate with the central server while the edge server is detached from the server cluster; determine a patch based on the jeopardy; push the patch to the edge server; validate the patch by performing regression testing; and responsive to validating the patch, induct the edge server into the server cluster.

In another aspect of the invention, there is system including a processor, a computer readable memory, one or more computer readable storage media, and program instructions collectively stored on the one or more computer readable storage media. The program instructions are executable to: predict a jeopardy associated with an edge server included in a server cluster, wherein each of the edge servers in the server cluster communicates with a central server at predefined intervals; responsive to predicting the jeopardy, detach the edge server from the server cluster, wherein other edge servers in the server cluster continue to communicate with the central server while the edge server is detached from the server cluster; determine a patch based on the jeopardy; push the patch to the edge server; validate the patch by performing regression testing; and responsive to validating the patch, induct the edge server into the server cluster.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to edge computing systems and, more particularly, to managing edge servers. The trend toward edge computing provides benefits to end users in the sense that transaction times are typically reduced compared to if the same transactions were performed at a central server (e.g., cloud server) instead of an edge server. However, edge computing brings new challenges in the areas of security and privacy, which challenges do not exist in systems where all the transactions are handled by a central server. For example, in a system that utilizes a central server and plural edge servers, a compromise (or jeopardy) at one of the edge servers can cascade to the central server and other ones of the edge servers, thereby impacting the entire system. For example, an edge server of a large enterprise with a multi-fold retail footprint interacts with a central server at the enterprise data center on a predefined frequency to transmit transaction data (e.g., point of sale terminal sales, store kiosk orders, offline transactions, etc.). In the event that a local store edge server becomes compromised, the set of nodes in the edge server are under a high risk to cascade the threat to the central server, thereby impacting all other stores of the retailer including the entire information technology (IT) ecosystem of the enterprise Similar to security considerations, there are other considerations such as functional (e.g., data corruption) and technical (e.g., elongated transaction boundaries between edge and central server) that amplify a local store edge server compromise to a global enterprise level impact.

Aspects of the invention address these problems by providing an artificial intelligence (AI) and natural language processing (NLP) based system and method that are configured to: contextually determine the transaction context of edge server interactions with a central server based on security, technical, or functional jeopardy affinity; detach the edge server (all or selected nodes of edge server cluster) from the central server to minimize the impact; automatically apply a software patch (e.g., a security patch, product patch, fix pack, etc.); trigger a regression test suite; and dynamically re-configure the synchronization intervals for entities with any interdependencies with the central server, including augmenting storage extensions needs on the edge server. Implementations include a dynamic timed creation of a simulated edge environment based on logs and synchronization time. The simulated edge environment may be used to test the functionality of the patch with a simulated version of the edge server, including negotiating with the simulated and real edge server to push the tested patch in segmented smart chunks. In embodiments, as part of a simulation of the edge environment, a regression testing step encompasses testing an entire application (e.g., patch) before inducting the self-healed edge node back into the cluster ecosystem. The entire application may include multiple components. In embodiments, in the event the entire application as a whole does not pass regression testing, the system automatically identifies such situations and breaks the application down into affected components as small units (termed as smart chunks) by modularizing regression testing coverage. In embodiments, the system decides how to segment the software patch into containerized chunks to be distributed from the central server to distributed edge servers optimally.

In accordance with aspects of the invention, the AI based system and method are configured to determine the transaction context of edge server interaction with a central server through various data sources such as (but not limited to) logs, log analyzer, heap or thread dumps, memory, CPU utilization, and network address translators. In embodiments, the system and method derive a threat correlation factor for predicted jeopardies. In embodiments, the system and method derive a dynamic timed creation of a simulated edge environment based on logs and synchronization time to test the functionality of the patch with a simulated version of the edge server, including negotiating with the simulated and real edge server to push the tested patch in segmented smart chunks. In embodiments, the system and method leverage the threat correlation factor, classify the determined transaction context into one or more jeopardy clusters, and automatically detach/block the edge server interactions with the central server. When there are one or multiple edge node(s) on the edge server cluster with jeopardy predictions, the system operates on those specific edge nodes only. In embodiments, the system and method automatically apply relevant patches for a specific jeopardy on the edge node(s) and accordingly notify the stake holders about this patch update. In embodiments, the system and method automatically trigger a regression suite on the edge node(s) after the patch update to verify (e.g., validate) the performance of the patch, validate the regression test results for production patch roll out, and notify the stake holders about this patch update. In embodiments, the system and method automatically induct the self-healed (fixed) edge node(s) into the edge server cluster, re-configure the synchronization intervals with the central server, dynamically calibrate synchronization times for specific entities for sequencing needs, and subsequently adjust the storage extensions needs of edge nodes.

In accordance with aspects of the invention, there is a method comprising: determining using an AI-based system a transaction context of edge server interaction with a central server through various data sources, wherein the data sources include logs, log analyzer, heap or thread dumps, memory, CPU utilization, and network address translators; deriving a threat correlation factor for the predicted jeopardies; deriving dynamically timed creation of simulated edge environments based on logs and synchronization time; determining a functionality and a relation between a simulated edge server and a real edge server to push a tested patch in segmented smart chunks; classifying one or more transaction contexts into one or more jeopardy clusters based on the threat correlation factor; automatically detaching edge server interaction with a central server based on the classified transaction context in the one or more jeopardy clusters; applying a relevant patch (e.g., fix pack) for a specific jeopardy on an edge node; and notifying a user of the applied relevant patch. In embodiments, the method includes verifying the relevant patch, wherein a regression test is applied to test results of the patch, wherein the verification is updated and notified to the user. In embodiments, the method includes inducting the patched edge node into an edge server cluster, wherein synchronization intervals with the central server are reconfigured. In embodiments, the method includes calibrating dynamically synchronization times for specific entities for sequencing needs; and adjusting subsequently storage extensions needs of edge nodes.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
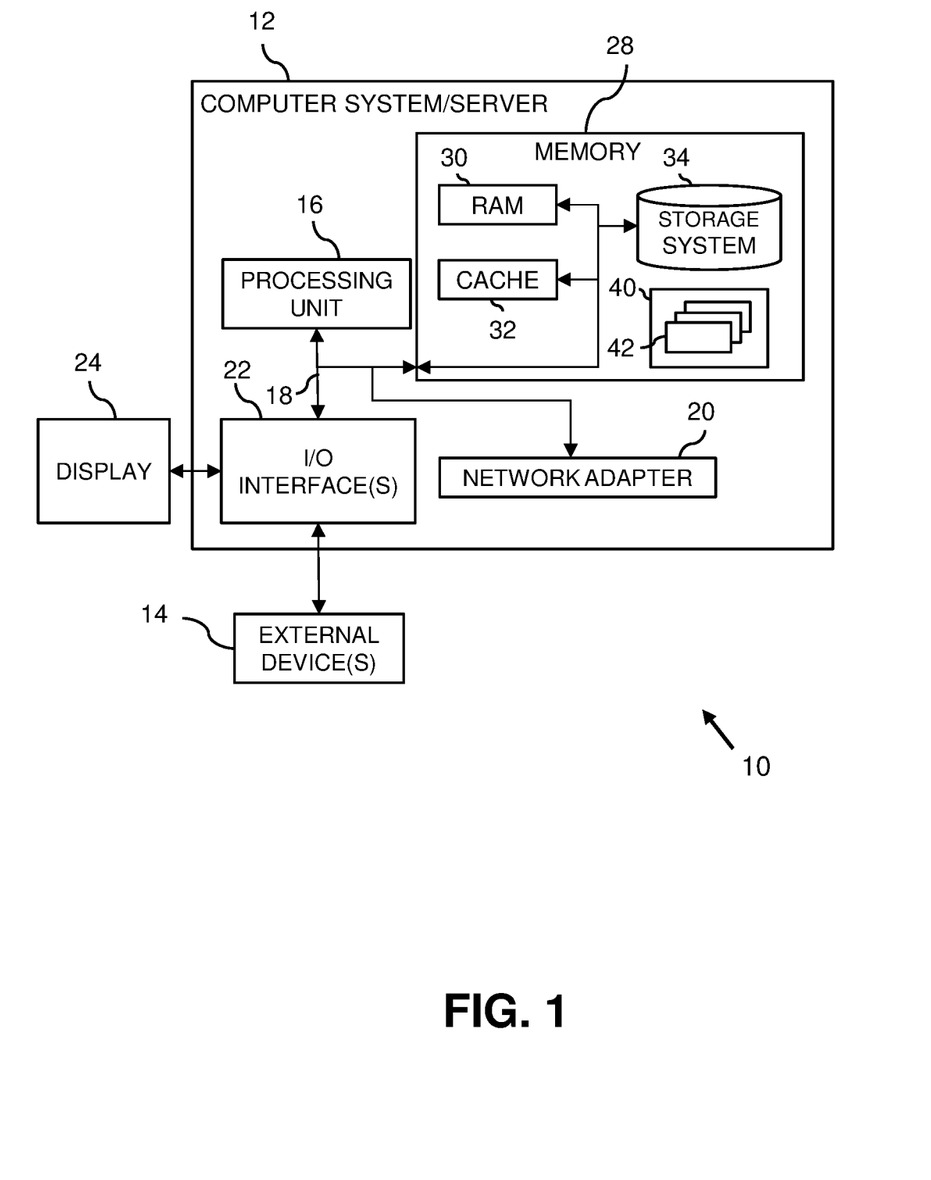
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
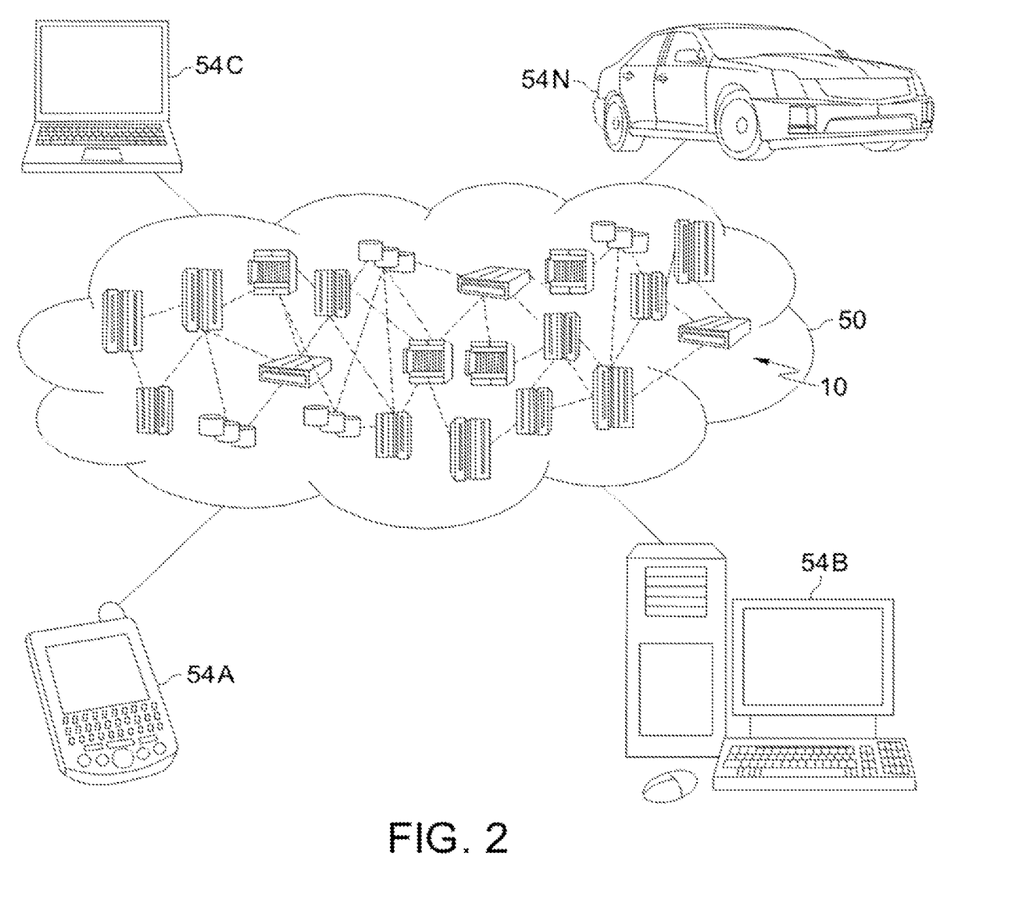
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
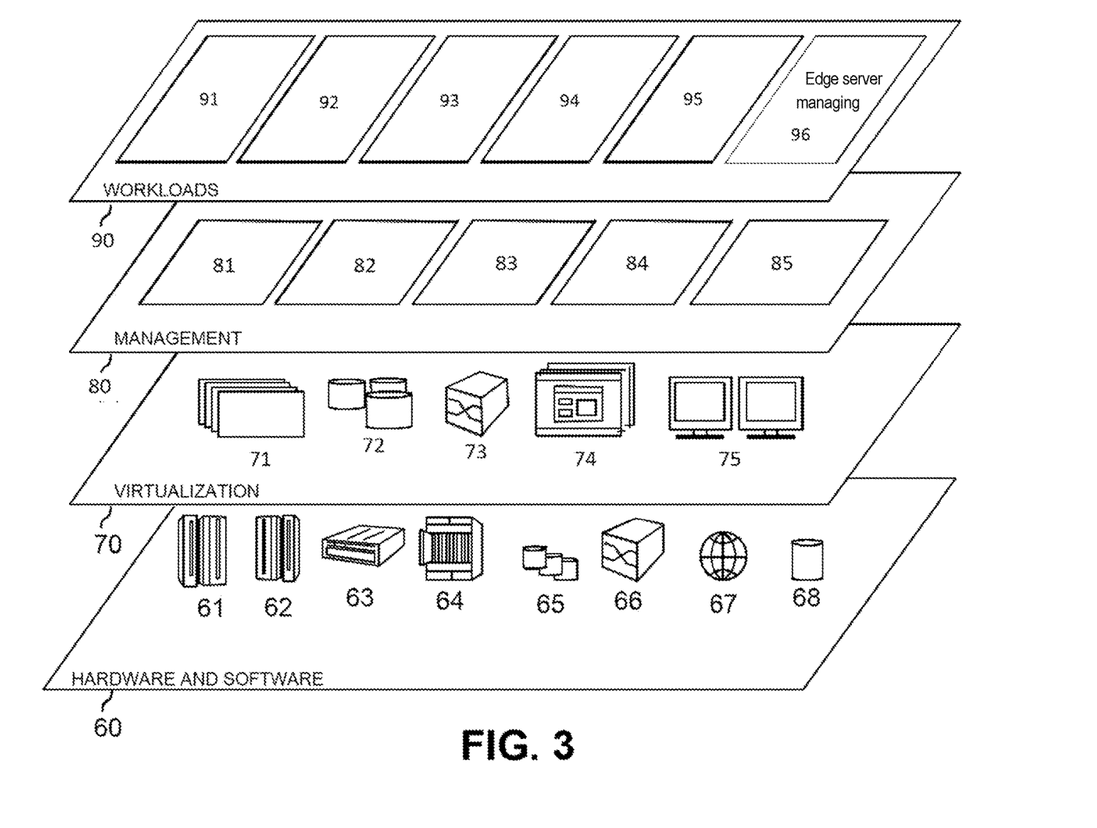
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and edge server managing 96.

Implementations of the invention may include a computer system/server 12 of FIG. 1 in which one or more of the program modules 42 are configured to perform (or cause the computer system/server 12 to perform) one of more functions of the edge server managing 96 of FIG. 3. For example, the one or more of the program modules 42 may be configured to: predict a jeopardy associated with an edge server included in a server cluster, wherein each of the edge servers in the server cluster communicates with a central server at predefined intervals; responsive to predicting the jeopardy, detach the edge server from the server cluster, wherein other edge servers in the server cluster continue to communicate with the central server while the edge server is detached from the server cluster; determine a patch based on the jeopardy; push the patch to the edge server; validate the patch by performing regression testing; and responsive to validating the patch, induct the edge server from the server cluster.

Figure 4:
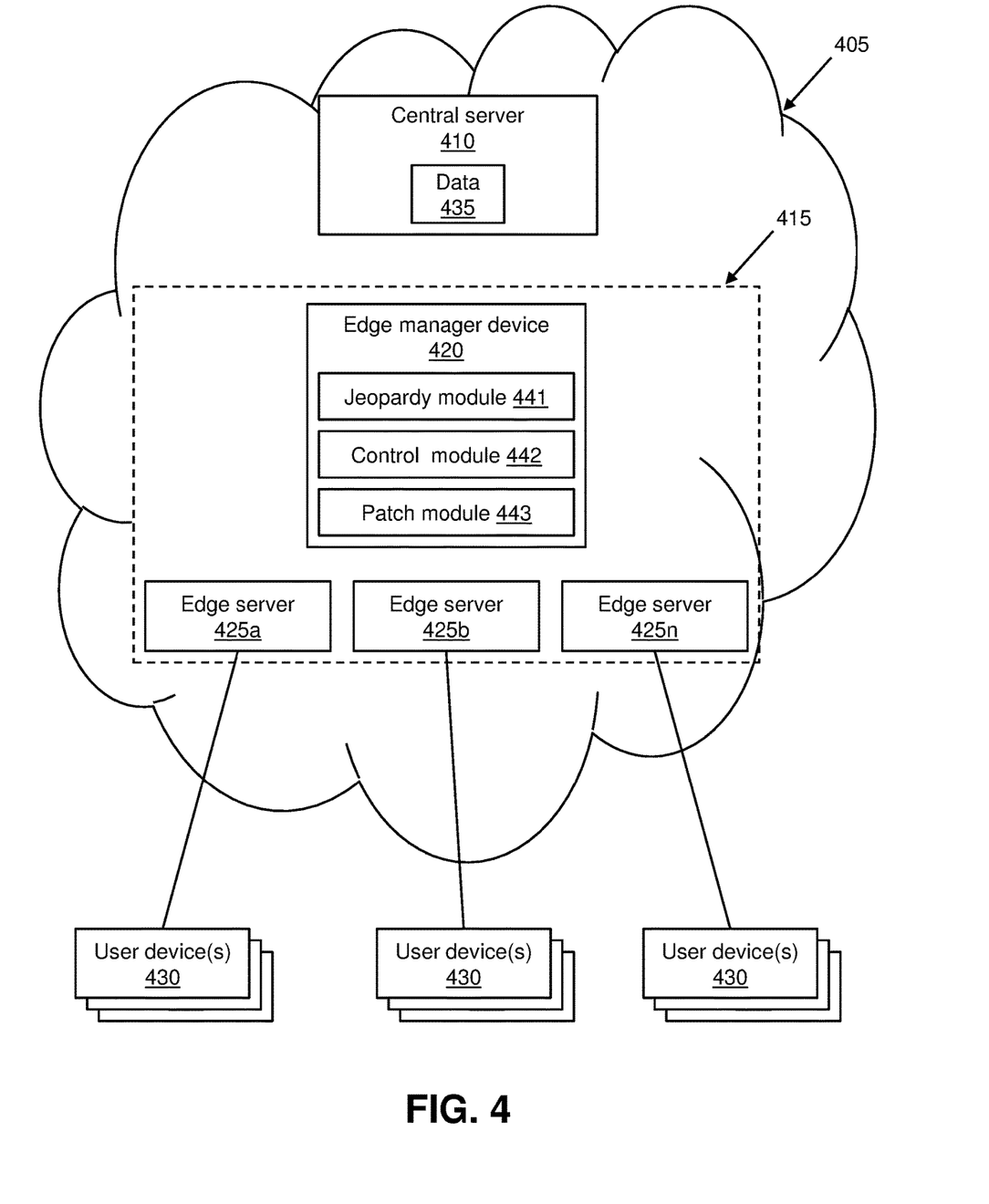
FIG. 4 shows a block diagram of an exemplary environment in accordance with aspects of the invention.

FIG. 4 shows a block diagram of an exemplary environment in accordance with aspects of the invention. In embodiments, the environment includes a distributed computing environment 405 that includes at least one central server 410 and an edge computing environment 415. In embodiments, the edge computing environment 415 includes an edge manager device 420 and edge servers 425a, 425b, . . . , 425n. In one example, each of the central server 410, edge manager device 420, and edge servers 425a-n is a computing device comprising one or more elements of the computer system/server 12 of FIG. 1. In another example, each of the central server 410, edge manager device 420, and edge servers 425a-n is implemented using a virtual machine or a container running on a physical server such as the computer system/server 12 of FIG. 1. The distributed computing environment 405 includes a network or combination of networks such as Private, Community, Public, or Hybrid clouds, and may include the Internet. Each of the central server 410, edge manager device 420, and edge servers 425a-n may communicate with one another in the distributed computing environment 405, directly or indirectly, using network communications.

In accordance with aspects of the invention, the edge manager device 420 and edge servers 425a-n are at an edge of the distributed computing environment 405 compared to the central server 410. Being at the edge of a network means that an end user device 430 is closer to these edge devices than it is to the central server 410. In one embodiment, closer in this context means physical distance. In an example of this embodiment, the user device 430 is physically located in Miami, Florida, the edge devices (edge manager device 420 and edge servers 425a-n) are physically located in Orlando, Florida, and the central server 410 is located in Chicago, Illinois. Miami is physically closer to Orlando than it is to Chicago, so the user device 430 is physically closer to the edge devices than it is to the cloud server. Closer in aspects of the invention is not limited to physical distance and can be defined using other measures that affect network time to deliver content to the user device 430.

Still referring to FIG. 4, the central server 410 stores data 435 that is used for providing services to end users via user devices 430. The user devices 430 may comprise a user computing device such as a desktop computer, laptop computer, tablet computer, smartphone, point of sale (POS) terminal, etc. In one example, a large retail enterprise includes plural physical stores, each containing plural user devices 430 that are used for various purposes such as inventory management, conducting sales transactions with customers of the enterprise, etc. In this example, the retail enterprise utilizes a central server 410 for managing their day-to-day omni channel orders. In this example, in order to take advantage of edge computing solutions, the retail enterprise utilizes plural edge servers 425a-n between the central server 410 and the user devices 430. In this example, the user devices 430 communicate with respective ones of the edge servers 425a-n in real-time or near real-time when conducting transactions (e.g., sales transactions). In this example, the edge servers 425a-n store a replicated copy of data from the central server 410, e.g., in a cache, and use this data to provide services to the user devices 430. In this example, each of the edge server 425a-n communicates with the central server 410 at predefined intervals (e.g., once an hour) for data and message exchange, for example, to update the replicated copy of data at the edge server. In this manner, when a user device 430 requests a service that uses the data, some or all of the computational tasks involved in answering the request are performed by one of the edge servers 425a-n using the replicated copy of the data rather than performing all the computational tasks by the cloud server 410. Performing some or all of the computational tasks at the edge servers (rather than at the cloud server) reduces the amount of time that data is being transmitted from one device to another, due to the physical distances between the respective devices. As a result, performing some or all of the computational tasks at the edge servers (rather than at the cloud server) reduces the latency of answering the request, which is desired by the end user.

In embodiments, the edge manager device 420 comprises a jeopardy module 441, control module 442, and a patch module 443, each of which may comprise one or more program modules such as program modules 42 described with respect to FIG. 1. The edge manager device 420 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

According to aspects of the invention, the jeopardy module 441 is configured to predict a jeopardy (e.g., a threat) associated with one of the edge servers 425a-n. In embodiments, the jeopardy module 441 predicts the jeopardy associated with one of the edge servers 425a-n (e.g., edge server 425a) based on analyzing transactions of the edge server 425a and the central server 410. In embodiments, the predicting the jeopardy includes determining a transaction context of the interactions of the edge server 425a with the central server 410. In embodiments, the transaction context is determined based on analyzing one or more data sources associated with the edge server 425a including but not limited to: logs, log analyzer, heap or thread dumps, memory, CPU utilization, and network address translators. In one example, the transaction context comprises a multi-dimensional vector where each dimension corresponds to a score or value derived by analyzing one or more of the data sources. In embodiments, the predicting the jeopardy includes determining correlation factors based on the transaction context. In one example, the jeopardy module 441 determines the correlation factors using machine learning models, such as ensembled bagging algorithms, that derive respective correlations between the transaction context and plural predicted jeopardies. In a particular example, the jeopardy module 441 determines each respective correlation factor by using machine learning, such as machine learning based clustering methods, to determine a correlation value between the multidimensional vector and one of plural predicted jeopardies that are defined in a knowledge corpus. In embodiments, the jeopardy module 441 predicts the jeopardy based on the determined correlation factors. In one example, the jeopardy module 441 predicts the jeopardy by selecting the one of the predicted jeopardies that has the highest correlation factor to this transaction context. In embodiments, the jeopardy is one of a security jeopardy, a technical jeopardy, and a functional jeopardy associated with the edge server 425a.

According to aspects of the invention, the control module 442 is configured to control aspects of the edge computing environment 415 including, among other things, detaching servers from and inducting servers into the edge computing environment 415. In embodiments, the control module 442 is configured to detach one of the edge servers 425a-n (e.g., edge server 425a) from the edge computing environment 415 in response to the jeopardy module 441 predicting there is a jeopardy associated with the edge server 425a. In one example, detaching the edge server 425a from the edge computing environment 415 comprises adjusting one or more parameters of the edge computing environment 415 so that the edge server 425a cannot communicate with the central server 410 and/or any of the other edges servers 425b-n while it is detached from the edge computing environment 415. In embodiments, the control module 442 is configured to induct the edge server 425a back into the edge computing environment 415 in response to the patch module 443 applying a patch to the edge server 425a and validating the patch. In one example, inducting the edge server 425a back into the edge computing environment 415 comprises adjusting one or more parameters of the edge computing environment 415 so that the edge server 425a can communicate with the central server 410 and/or any of the other edges servers 425b-n.

In a particular example, each of the edge servers 425a-n comprises a container (e.g., a Kubernetes container) running on a respective server node, the edge computing environment 415 is a container cluster, and the edge manager device 420 comprises or is part of a control plane of the container cluster. In this example, the control plane maintains data that defines the containers included in the container cluster and communication channels for the containers in the container cluster. In this example, detaching the edge server 425a from the edge computing environment 415 comprises removing (e.g., deleting) the container running the edge server 425a from the definition of the container cluster. In this example, inducting the edge server 425a back into the edge computing environment 415 comprises adding the container running the edge server 425a to the container cluster.

According to aspects of the invention, the patch module 443 is configured to determine a patch for one of the edge servers 425a-n, apply the patch to the one of the edge servers 425a-n, and validate the patch. In embodiments, the patch module 443 determines a particular patch to apply to the one of the edge servers 425a-n (e.g., edge server 425a) based on the particular jeopardy that is predicted as being associated with this edge server 425a. In embodiments, the patch module 443 determines smart chunks of the patch by testing the patch with a simulated version of the edge server 425a in a simulated environment. In embodiments, the patch module 443 pushes the patch to the edge server 425a so that the patch can be applied to the edge server 425a. In one example, after determining the smart chunks in the simulated environment, the patch module 443 pushes the smart chunks to the edge server 425a. In embodiments, the patch module 443 validates the patch after the patch has been applied to the edge server 425a. In one example, the validation includes regression testing of the edge server 425a after the patch has been applied to the edge server 425a.

In an exemplary implementation, an enterprise utilizes the central server 410 and edge servers 425a-n in a hybrid cloud platform to host business applications that perform transactions. In embodiments, the jeopardy module 441 uses one or more log analysis and investigation tools to analyze data involved in transactions between the edge servers 425a-n and the central server 410. Such tools may be utilized to analyze and monitor a wide variety of data such as application logs, web server logs, clickstream data, message queues, OS system metrics, sensor data, syslog, Windows events, and web proxy logs in many supported formats. Such tools may be used to obtain insights about the data. In embodiments, the jeopardy module 441 uses one or more such tools to determine transaction type, category, sequence, date time, etc., of transactions between the edge servers 425a-n and the central server 410. In embodiments, based on the insights determined in this manner, the jeopardy module 441 uses NLP based machine learning to classify transactions based on log file entries into feature types such as: functional, technical, and security. In embodiments, the jeopardy module 441 determines a transaction context of a transaction using one or more of the data sources (a)-(h):

(a) Error codes during failures. In embodiments, the system uses a natural language classifier service to learn error descriptions from stack traces, and to classify transactions based on log file entries and for the context derivation.

(b) Reason codes, notes, instructions used on business documents. In embodiments, reason codes, notes, instructions used on business documents by personnel are made available to the system through a business audits engine, and the system may classify this information using the natural language classifier service.

(c) Transactions breaching business thresholds, tolerances, and hardware sizing constraints are made available to the system through health monitors, memory, CPU utilization, and/or memory-heap (RAM) tools on any OS hosted platform.

(d) Application, software, or hardware sizing constraints on memory, CPU, and/or storage.

(e) Long-running backend processes that are extended beyond a stipulated time through process profiles generated at an OS level, database explain plans, and/or session objects.

(f) Concurrent business users at any given time of business day made available through the number of user active connections to the system.

(g) Historical behavior of a business application with respect to a specific transaction in the system, an incident that resulted from the specific transaction, and one or more actions taken in response to the incident. This information may be stored in the knowledge corpus that is utilized with machine learning models in accordance with aspects of the invention.

(h) Jeopardy management policies, data about jeopardy incidents that previously occurred, and data about how the jeopardy incidents were treated in line with business policies. This information may be stored in the knowledge corpus that is utilized with machine learning models in accordance with aspects of the invention.

In embodiments, data from data sources (a)-(h) can be in various forms including but not limited to structured database reports, semi-structured spreadsheet files, and/or unstructured raw data. In embodiments, the jeopardy module 441 parses these sources for relevant content using data extraction tools such as natural language processing, etc.

With continued reference to the exemplary implementation, the jeopardy module 441 employs advanced machine learning techniques, such as ensembled bagging algorithms, that derive a correlation factor with respect to the determined transaction context and predicted jeopardies.

With continued reference to the exemplary implementation, before pushing a patch to the compromised edge server (e.g., edge server 425a in this example), the patch module 443 collects the exact configuration and versions of all running software on the edge server 425a and the central server 410. In embodiments, the patch module 443 uses this unique software configuration and versioning information to create a simulated environment that includes a temporary virtual server (e.g., a simulated copy of the edge server 425a) that is configured identically to the actual (e.g., real-world) edge server 425a.

With continued reference to the exemplary implementation, the patch module 443 uses this unique software configuration and versioning to generate a token that is used to ensure that the patch is applied only to the compromised edge server 425a. In embodiments, the patch module 443 generates the token by processing this unique software configuration and versioning information through a hash function such as an MD5sum algorithm. In embodiments, the token is referred to as a ConfigToken.

With continued reference to the exemplary implementation, the patch module 443 applies any missing updates and/or patches to the virtual server in the simulated environment and performs regression testing on all functionality of the virtual server. In one example, the updates and/or patches comprise updates and patches that are relevant to (i.e., designated for) the edge server 425a but that have not been applied to the edge server 425a. If the virtual server passes the regression testing after being updated with updates and/or patches, then the patch module 443 generates a new patch for the edge server 425a based on a difference between the edge server 425a actual configuration and the patched configuration of the virtual server. In embodiments, the patch module 443 compresses and encrypts the new patch with ConfigToken as the password.

With continued reference to the exemplary implementation, when the new patch is copied to the edge server 425a for implementation, the edge server 425a must calculate a token that matches the ConfigToken in order to decompress and decrypt the patch. In embodiments, the edge server 425a that receives the new patch generates a token using its current software configuration and versioning information, and also using the same algorithm that was used by the patch module 443 to create the ConfigToken. If the edge server 425a has the same software configuration and versioning information as was used by the patch module 443 to create the ConfigToken, then the token created by the edge server 425a will match the ConfigToken, and the edge server is able to use its generated token to decompress and decrypt the patch. If the edge server 425a has a different software configuration and versioning information than was used by the patch module 443 to create the ConfigToken, then the token created by the edge server 425a will not match the ConfigToken, and the edge server cannot decompress and decrypt the patch. For example, if the new patch is copied to a different edge server (e.g., edge server 425b instead of the intended edge server 425a), the edge server 425b will generate a token that does not match the ConfigToken because the edge server 425b has a different software configuration and versioning information than that of the edge server 425a, which was used by the patch module 443 to create the ConfigToken. This protects the edge server 425b from applying a patch that was not intended for edge server 425b (e.g., not fully regression tested in the exact state of edge server 425b). In another example, if the new patch is copied to the correct edge server (e.g., edge server 425a in this example), and if the edge server 425a has changed its configuration in the meantime, then the token generated by the edge server 425a will not match the ConfigToken due to the changed configuration of the edge server 425a. This protects the edge server 425a from applying a patch that is designed for a different configuration of the edge server 425a.

With continued reference to the exemplary implementation, based on the correlation factor threat assessment value, the control module 442 detaches the compromised edge server (e.g., edge server 425a in this example) from the edge server cluster as a proactive approach to minimize the impact through the cluster management framework. In embodiments, the patch module 443 then automatically looks up an appropriate security patch and applies the relevant patch on the edge node(s) through DevOps methodologies inclusive of building and deploying a new patch. In embodiments, the patch module 443 then triggers continuous integration and continuous deployment (CICD) processes to evaluate the performance of patch deployed through validating the regression test framework as configured. In embodiments, the patch module 443 then notifies stake holders about the patch and test results through any of communication channels configured including email, messaging, etc. In embodiments, the control module 442, based on test results success, leverages cluster management tools to perform the following: induct the fixed (self-healed) edge node(s) into edge cluster; reconfigure the synchronization intervals of newly inducted edge server node(s) with the central server, and dynamically calibrate synchronization times for specific entities for sequencing and interdependency needs; and adjust the storage extensions needs of edge nodes (e.g., to catch up on lost transactions over healing window).

Aside from the methods described above to prevent downtime due to improper patches being applied, there may also be instances where a full multicomponent patch may not pass regression testing due to a component within it that breaks a certain functionality of the edge server to which the patch is applied. In embodiments, when a full patch does not pass regression testing on the detached edge server, the system (e.g., the patch module 443) automatically tries to determine the broken component by modularizing the patch contents using half-interval search. For example, if a patch containing 100 components fails regression testing, the system will regression test the first 50 components. Continuing this example, if the patched edge server passes the regression test of the first 50 components of the patch, then the system deems that the broken component is not part of the first 50 components. In this case, the system then divides the remaining components into two groups (e.g., components 51-75 and components 76-100) and tests the components in the first group. If that passes, then the system has eliminated 75 components by doing only two regression tests. In embodiments, the system continues to iterate over half of the remaining components until the problematic component is identified. In embodiments, after identifying the problematic component, the system then generates a patch that includes all the previous components except for the problematic component and pushes this patch to the edge server. In embodiments, the system alerts the system administrator of the issue so that a bug report can be generated for the identified problematic component.

Figure 5:
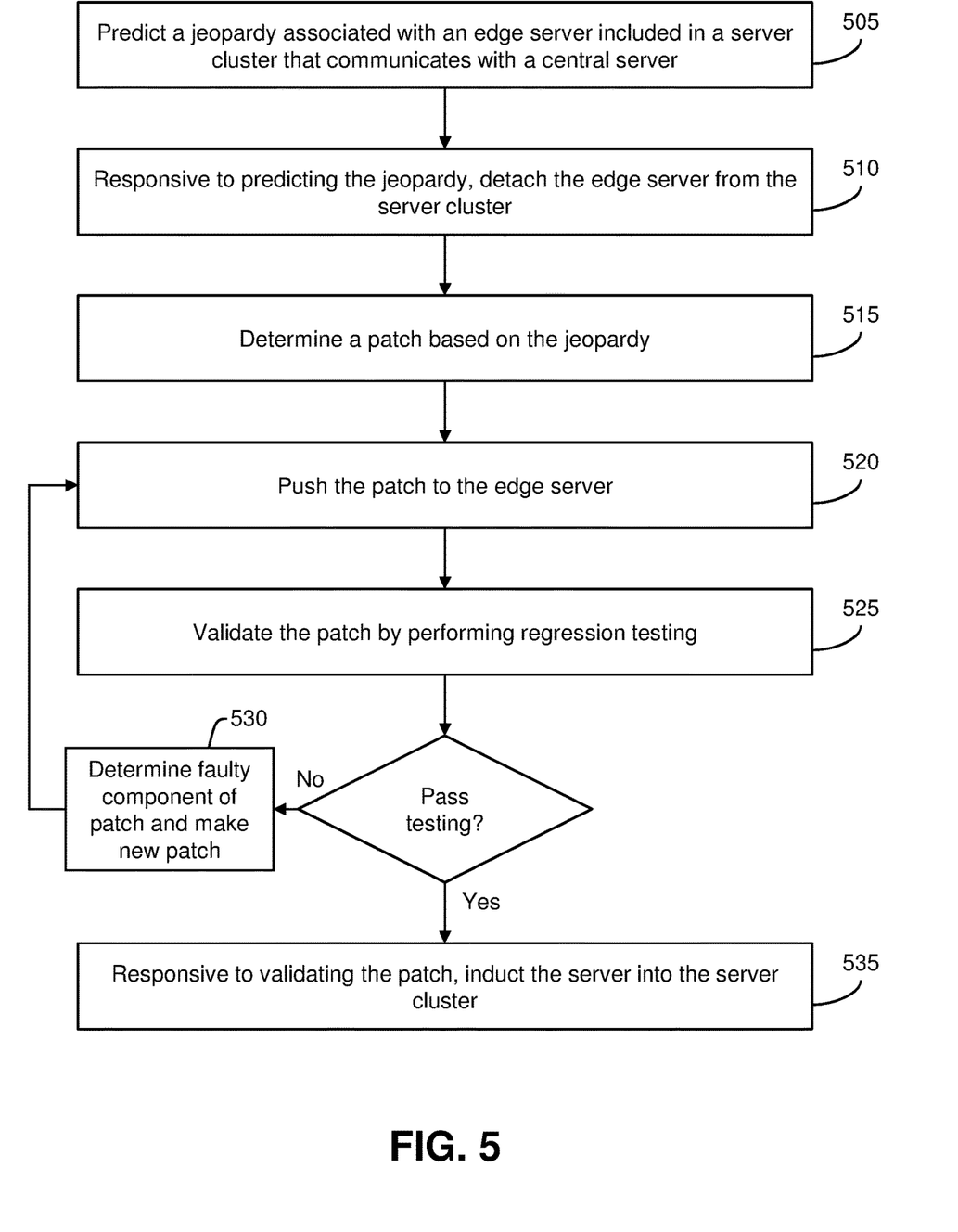
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 505, the system predicts a jeopardy associated with an edge server included in a server cluster that communicates with a central server. In embodiments, and as described with respect to FIG. 4, the jeopardy module 441 predicts a jeopardy associated with one of the edge servers 425a-n based on analyzing transactions of the edge server and the central server 410. In embodiments, the predicting the jeopardy includes determining a transaction context of the interactions of the edge server with the central server 410. In embodiments, the transaction context is determined based on analyzing one or more data sources including but not limited to data sources (a)-(h) described herein. In embodiments, the predicting the jeopardy includes determining correlation factors based on the transaction context and plural predicted jeopardies that are defined in a knowledge corpus. In embodiments, the jeopardy module 441 predicts the particular jeopardy based on the determined correlation factors. In embodiments, the jeopardy is one of a security jeopardy, a technical jeopardy, and a functional jeopardy associated with the edge server.

At step 510, responsive to predicting the jeopardy, the system detaches the compromised edge server (from step 505) from the server cluster. In embodiments, and as described with respect to FIG. 4, the control module 442 removes the compromised edge server from the server cluster. This detaching prevents the compromised edge server from communicating with the central server 410 which, in turn, prevents propagation of the jeopardy throughout the rest of the system.

At step 515, the system determines a patch based on the jeopardy (from step 505). In embodiments, and as described with respect to FIG. 4, the patch module 443 determines a patch to apply to the compromised edge server. In embodiments, the patch module 443 creates a simulated environment with a simulated copy of the compromised edge server and updates the simulated copy of the compromised edge server with any known updates and/or patches that are missing from the simulated copy of the compromised edge server. The patch module then tests the updated simulated copy of the compromised edge server. If the updated simulated copy of the compromised edge server passes the test(s), then the patch module 443 creates a new patch based on a difference (as described herein) and pushes the new patch to the actual (real-world) compromised edge server. If the updated simulated copy of the compromised edge server fails the test(s), then the patch module 443 creates a new patch using DevOps tools (as described herein) and pushes the new patch to the actual (real-world) compromised edge server. In both cases, the patch module 443 may encrypt the new patch with a ConfigToken, which requires the edge server that receives the patch to successfully generate a matching token in order to decrypt and apply the patch.

At step 520, the system pushes the patch to the compromised edge server. In embodiments, and as described with respect to FIG. 4, the patch module 443 pushes the new patch (from step 515) to the compromised edge server. Step 520 may include the compromised edge server generating a token that decrypts the new patch, e.g., as described herein.

At step 525, the system validates the patch by performing regression testing. In embodiments, and as described with respect to FIG. 4, the patch module 443 performs regression testing on the compromised edge server after the patch (from step 520) has been applied to the compromised edge server. In the event the compromised edge server (now patched) passes the testing, then the method proceeds to step 535. In the event the compromised edge server (now patched) fails the testing, then at step 530 the patch module 443 determines which component of the patch is broken, generates a new patch that does not include the broken component, and pushes the new patch to the compromised edge server and repeats the regression testing.

At step 535, responsive to validating the patch, the system inducts the edge server back into the server cluster. In embodiments, and as described with respect to FIG. 4, the control module 442 adds the edge server back into the server cluster. Step 535 may include: inducting the patched edge server into edge cluster; reconfiguring the synchronization intervals of the newly inducted edge server with the central server; dynamically calibrating synchronization times for specific entities for sequencing and interdependency needs; and adjusting the storage extensions needs of edge nodes.

An exemplary use case is described to illustrate aspects of embodiments the invention. In the use case, XYZCorp is a big box retailer that has plural physical stores, and that uses a central server and plural edge servers to handle business data and applications that are used by user devices at the physical stores. In this example, the edge servers contact the central server at predefined intervals for data and message exchange. This is to take advantage of edge computing solutions and also to handle offline scenarios of certain remote stores. In this example, on one business day, edge server security at one of their stores is compromised due to a user clicking on a random link on their user device. In this example, the edge server stayed connected to the central server, and the compromise that originated at the edge server propagated to the central server with which the edge server was communicating. This resulted in an enterprise data breach for XYZCorp. Meanwhile, order processing slowed down across all retail stores of XYZCorp due to elongated downtimes affecting millions of dollars and the brand reputation of the enterprise. Manual triaging, restore, and recovery procedures were applied with and agreed Recovery Time Objective (RTO) and Recovery Point Objective (RPO) were taken into consideration. However, even with these fixes, data inconsistency issues resulted because the edge server predefined sync intervals for individual entities were broken, and interdependencies became stale. For example, payment transaction (for an order) syncing prior to order creation transaction from edge server to central server creates exceptions and failures.

In this same example, if the XYZCorp system included an embodiment of the invention, the edge manager device 420 would determine the compromised situation at the affected edge server based on any of the predicted jeopardies. The edge manager device 420 would then automatically detach/block the edge server node(s) from communicating with the central server, thereby preventing the cascading negative effect across the enterprise. In this scenario, order processing and business transactions across other retail stores of the enterprise continue to operate in normal mode because the problem did not cascade to the central server. In this scenario, the edge manager device 420 applies relevant security patches on the edge node(s) and accordingly notifies the stake holders about this patch update. In this scenario, the edge manager device 420 automatically triggers the regression suite on the edge node(s) after the patch update to verify the performance of the patch, validates the regression test results for production patch roll out, and notifies the stake holders about this patch update. In this scenario, the edge manager device 420 creates a dynamic timed creation of a simulated edge environment based on the above analysis and synchronization time to test the functionality and negotiating with the simulated and real edge servers to push the tested patch in segmented smart chunks to the actual edge server. In this scenario, the edge manager device 420 automatically inducts the self-healed (fixed) edge node(s) into the edge server cluster, reconfigures the synchronization intervals with central server, dynamically calibrates synchronization times for specific entities for sequencing and interdependency needs, and subsequently augments the storage extensions needs of edge node(s). In this scenario, the entire enterprise is not affected, which minimizes the impact to the edge store, saving millions of dollars and providing the stake holders with relief that the system is prepared for any such future incidents with a proactive solution.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method performed by an edge manager device in a server cluster, the method comprising:
predicting a jeopardy associated with an edge server included in the server cluster that communicates with a central server;
responsive to the predicting the jeopardy associated with the edge server, detaching the edge server from the server cluster;
determining a patch based on the jeopardy associated with the edge server;
determining a software configuration and versioning information of the edge server;
generating a token using a hash function based on the software configuration and versioning information of the edge server;
encrypting the patch with the token as a password;
pushing the patch to the edge server;
validating the patch by performing a regression testing on the edge server after the patch has been applied to the edge server; and
inducting the edge server into the server cluster, wherein the inducting is performed in response to the validating the patch.

2. The method of claim 1, wherein the predicting the jeopardy associated with the edge server includes determining a transaction context of interactions of the edge server with the central server.

3. The method of claim 2, wherein the determining the transaction context of the interactions of the edge server with the central server comprises analyzing one or more data sources selected from a group consisting of: logs; log analyzer; heap or thread dumps; memory; CPU utilization; and network address translators.

4. The method of claim 2, wherein the predicting the jeopardy associated with the edge server includes determining correlation factors based on the transaction context of the interactions of the edge server with the central server.

5. The method of claim 4, wherein the determining correlation factors comprises using machine learning models that derive respective correlations between the transaction context of the interactions of the edge server with the central server and a plurality of predicted jeopardies associated with the edge server.

6. The method of claim 5, wherein the machine learning models comprise ensembled bagging algorithms.

7. The method of claim 4, wherein the jeopardy associated with the edge server is predicted based on the correlation factors.

8. The method of claim 2, wherein the jeopardy associated with the edge server is one of a security jeopardy, a technical jeopardy, and a functional jeopardy.

9. The method of claim 1, further comprising:
generating a simulated edge environment based on logs and synchronization time of the edge server, wherein the simulated edge environment includes a simulated version of the edge server.

10. The method of claim 9, further comprising:
testing the patch on the simulated version of the edge server in the simulated edge environment.

11. The method of claim 10, wherein the testing the patch comprises testing the patch in segmented smart chunks.

12. The method of claim 1, wherein:
the generating the token using the hash function comprises inputting the software configuration and versioning information of the edge server into the hash function; and
the encrypting the patch with the token as the password is performed prior to the pushing the patch to the edge server.

13. The method of claim 1, further comprising:
responsive to determining the edge server fails the regression testing, identifying a faulty component of the patch;
creating a new patch without the faulty component of the patch; and
pushing the new patch to the edge server.

14. The method of claim 1, wherein the inducting comprises:
reconfiguring synchronization intervals of the edge server with the central server;
dynamically calibrating synchronization times for specific entities for sequencing and interdependency needs; and
adjusting storage extensions needs of other edge servers included in the server cluster.

15. A computer program product comprising one or more computer readable storage media having program instructions collectively stored on the one or more computer readable storage media, the program instructions executable to:
predict a jeopardy associated with an edge server included in a server cluster that communicates with a central server;
responsive to the predicting the jeopardy associated with the edge server, detach the edge server from the server cluster, wherein other edge servers included in the server cluster continue to communicate with the central server while the edge server is detached from the server cluster;
determine a patch based on the jeopardy associated with the edge server;
determine a software configuration and versioning information of the edge server;
generate a token using a hash function based on the software configuration and versioning information of the edge server;
encrypt the patch with the token as a password;
push the patch to the edge server;
validate the patch by performing a regression testing on the edge server after the patch has been applied to the edge server; and
induct the edge server into the server cluster, wherein the inducting is performed in response to the validating the patch.

16. The computer program product of claim 15, wherein the predicting the jeopardy associated with the edge server includes:
determining a transaction context of interactions of the edge server with the central server; and
determining correlation factors using machine learning models that derive respective correlations between the transaction context of the interactions of the edge server with the central server and a plurality of predicted jeopardies associated with the edge server.

17. The computer program product of claim 15, wherein the program instructions are further executable to:
generate a simulated edge environment based on logs and synchronization time of the edge server, wherein the simulated edge environment includes a simulated version of the edge server; and test the patch on the simulated version of the edge server in the simulated edge environment.

18. The computer program product of claim 15, wherein:

the generating the token using the hash function comprises inputting the software configuration and versioning information of the edge server into the hash function; and the encrypting the patch with the token as the password is performed prior to the pushing the patch to the edge server.

19. A system comprising:

a processor, a memory, one or more computer readable storage media, and program instructions collectively stored on the one or more computer readable storage media, the program instructions executable to:

predict a jeopardy associated with an edge server included in a server cluster, wherein the edge server and other edge servers included in the server cluster communicate with a central server at predefined intervals;

responsive to the predicting the jeopardy associated with the edge server, detach the edge server from the server cluster, wherein the other edge servers included in the server cluster continue to communicate with the central server while the edge server is detached from the server cluster;

determine a patch based on the jeopardy associated with the edge server;

push the patch to the edge server;

validate the patch by performing a regression testing on the edge server after the patch has been applied to the edge server; and induct the edge server into the server cluster, wherein the inducting is performed in response to the validating the patch, and wherein the inducting comprises:

reconfiguring synchronization intervals of the edge server with the central server;

dynamically calibrating synchronization times for specific entities for sequencing and interdependency needs; and adjusting storage extensions needs of the other edge servers included in the server cluster.

20. The system of claim 19, wherein the predicting the jeopardy associated with the edge server includes:

determining a transaction context of interactions of the edge server with the central server; and determining correlation factors using machine learning models that derive respective correlations between the transaction context of the interactions of the edge server with the central server and a plurality of predicted jeopardies associated with the edge server.

* * * * *